(12) United States Patent
Lee et al.

(10) Patent No.: US 8,938,121 B2
(45) Date of Patent: Jan. 20, 2015

(54) METHOD AND APPARATUS FOR PROCESSING IMAGE

(71) Applicants: Samsung Techwin Co., Ltd., Changwon (KR); Industry-Academic Cooperation Foundation, Yonsei University, Seoul (KR)

(72) Inventors: Jeong-Ahn Lee, Changwon (KR); Moon-gi Kang, Seoul (KR); Sang-wook Park, Seoul (KR); Paul Oh, Seoul (KR)

(73) Assignees: Samsung Techwin Co., Ltd., Changwon (KR); Industry-Academic Cooperation Foundation, Yonsei University, Seoul (KR)

( * ) Notice: Subject to any disclaimer, the term of this patent is extended or adjusted under 35 U.S.C. 154(b) by 12 days.

(21) Appl. No.: 13/915,993

(22) Filed: Jun. 12, 2013

(65) Prior Publication Data
US 2014/0153823 A1    Jun. 5, 2014

(30) Foreign Application Priority Data
Nov. 30, 2012    (KR) .................... 10-2012-0138437

(51) Int. Cl.
*G06K 9/00* (2006.01)
*G06T 3/40* (2006.01)
(52) U.S. Cl.
CPC ................... *G06T 3/4015* (2013.01)
USPC ....................................... 382/167

(58) Field of Classification Search
USPC .................... 382/162, 167, 274–275, 300
See application file for complete search history.

(56) References Cited

U.S. PATENT DOCUMENTS 7,006,704 B2    2/2006   Kobayashi et al.
7,212,686 B2    5/2007   Someya et al.

FOREIGN PATENT DOCUMENTS

| KR | 10-0741517 B1 | 7/2007 |
|---|---|---|
| KR | 10-0866187 B1 | 10/2008 |
| KR | 10-2012-0061079 A | 6/2012 |

*Primary Examiner* — Duy M Dang
(74) *Attorney, Agent, or Firm* — Sughrue Mion, PLLC

(57) ABSTRACT

An image processing apparatus includes an adaptive interpolation device which converts a MFA pattern image into a quincuncial pattern image based on difference values, and interpolates color channels and an NIR channel, based on difference values of the converted quincuncial pattern image in vertical and horizontal pixel directions; a frequency compensation device which obtains a high-resolution MFA image using high-frequency and medium-frequency components of a high-resolution base image, based on linear regression analysis and compared energy levels of MFA channel images to an energy level of a base image; and a channel interference suppression device which removes color distortion generated between each channel of the high-resolution MFA image, and another channel of the high-resolution MFA image and a base channel using a weighted average of pixel value differences between each channel of the high-resolution MFA image, and the other channel of the high-resolution MFA image and the base channel.

16 Claims, 16 Drawing Sheets

METHOD AND APPARATUS FOR PROCESSING IMAGE

CROSS-REFERENCE TO RELATED PATENT APPLICATION

This application claims priority from Korean Patent Application No. 10-2012-0138437, filed on Nov. 30, 2012, in the Korean Intellectual Property Office, the disclosure of which is incorporated herein in its entirety by reference.

BACKGROUND

1. Field

Exemplary embodiments relate to an apparatus for processing an image. In particular, exemplary embodiments relate to a method of processing an image obtained by using a multispectral filter array (MFA).

2. Description of the Related Art

In order to simultaneously obtain an image of a visible band and a near infrared (NIR) image of an invisible band, channel images are simultaneously obtained by using a related art multispectral filter array (MFA).

However, since a pattern image obtained by using the related art MFA is obtained by sampling color channels and an NIR channel, a resolution of the pattern image is low.

SUMMARY

Exemplary embodiments may provide a method and apparatus for processing an image to solve a problem of a limited resolution of each image, when an image of a visible band and a near infrared (NIR) image of an invisible band are simultaneously obtained.

Exemplary embodiments may also provide a method and apparatus for processing an image to generate a high-resolution base image by receiving a low-resolution multispectral filter array (MFA) pattern image as an input image.

Further, in exemplary embodiments, a high-resolution base image is generated using a low-resolution MFA pattern image including color (red, green, and blue) and NIR channel images obtained through a multispectral (MS) filter. In this case, a high-resolution image including high-frequency information and small artifacts is generated.

According to an aspect of the exemplary embodiments, there is provided an image processing apparatus including an adaptive interpolation device configured to convert a multispectral filter array (MFA) pattern image into a quincuncial pattern image based on difference values in a diagonal pixel direction, and interpolate color channels and a near infrared (NIR) channel of the MFA pattern image to a maximum resolution, based on difference values of the converted quincuncial pattern image in vertical pixel directions and horizontal pixel directions; a frequency compensation device configured to obtain a high-resolution MFA image using high-frequency components and medium-frequency components of a high-resolution base image corresponding to high-frequency components and medium-frequency components of a low-resolution MFA image interpolated by the adaptive interpolation device, based on linear regression analysis and a result of comparing energy levels of MFA channel images to an energy level of a base image; and a channel interference suppression device configured to remove color distortion generated between each channel of the high-resolution MFA image, and a first channel of the high-resolution MFA image and a base channel using a weighted average of pixel value differences between each channel of the high-resolution MFA image, and a second channel of the high-resolution MFA image and the base channel.

According to another aspect of the exemplary embodiments, there is provided an image processing method including converting a multispectral filter array (MFA) pattern image into a quincuncial pattern image based on difference values in a diagonal pixel direction, and then interpolating color channels and a near infrared (NIR) channel of the MFA pattern image to a maximum resolution, based on difference values of the converted quincuncial pattern image in vertical pixel directions and horizontal pixel directions, using an adaptive interpolation device; obtaining a high-resolution MFA image using high-frequency components and medium-frequency components of a high-resolution base image corresponding to high-frequency components and medium-frequency components of a low-resolution MFA image interpolated by the adaptive interpolation device, based on linear regression analysis and a result of comparing energy levels of MFA channel images to an energy level of a base image, using a frequency compensation device; and removing color distortion generated between each channel of the high-resolution MFA image, and a first channel of the high-resolution MFA image and a base channel using a weighted average of pixel value differences between each channel of the high-resolution MFA image, and a second channel of the high-resolution MFA image and the base channel, using a channel interference suppression device.

BRIEF DESCRIPTION OF THE DRAWINGS

The above and other features and advantages of the exemplary embodiments will become more apparent by describing in detail exemplary embodiments thereof, with reference to the attached drawings in which.

DETAILED DESCRIPTION OF THE EXEMPLARY EMBODIMENTS

The terminology used herein is for the purpose of describing particular embodiments and is not intended to limit the exemplary embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined differently, all terms used in the description, including technical and scientific terms, have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning.

Figure 1:
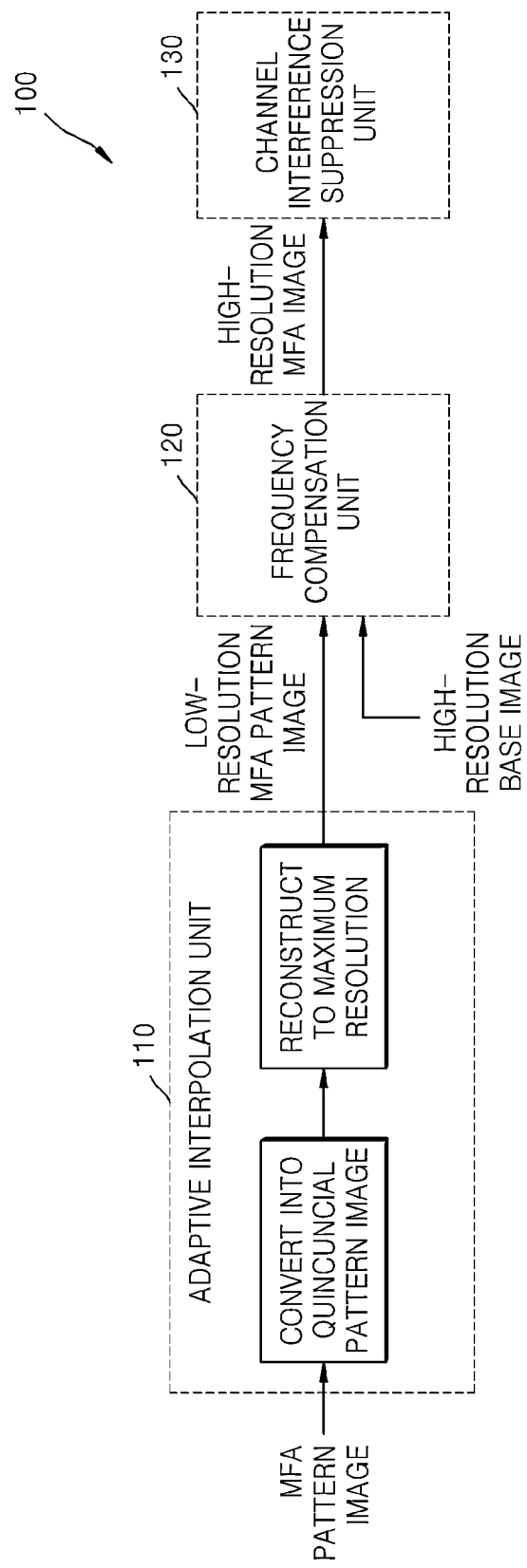
FIG. 1 is a structural diagram of an image processing apparatus according to an embodiment.

FIG. 1 is a structural diagram of an image processing apparatus 100 according to an embodiment.

An example of the image processing apparatus 100 is a camera system that may be an image capturing system, such as a digital camera, a camcorder, or a security camera, or may be mounted in a computer, a personal digital assistant (PDA), a portable multimedia player (PMP), or a mobile phone.

The image processing apparatus 100 receives a multispectral filter array (MFA) pattern image output from an image sensor, including an MFA having color filters and a near infrared (NIR) filter, as an input image.

The image processing apparatus 100 receives a low-resolution MFA pattern image as an input image, and generates a high-resolution base image having much high-frequency information and few artifacts.

The image processing apparatus 100 includes an adaptive interpolation unit 110, a frequency compensation unit 120, and a channel interference suppression unit 130.

Figure 2:
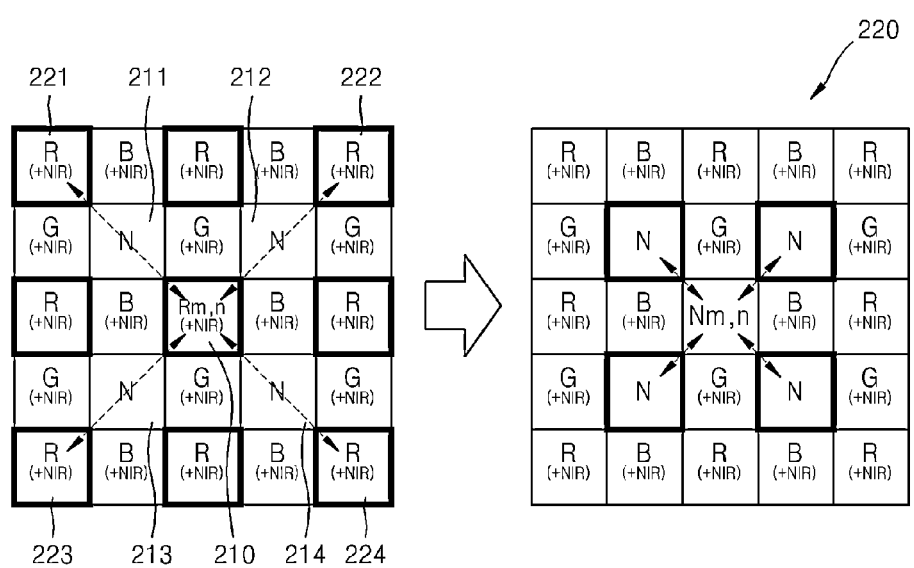
FIG. 2 is a diagram showing an example of converting a multispectral filter array (MFA) pattern image into a quincuncial pattern image.

As illustrated in FIG. 2, the adaptive interpolation unit 110 converts an MFA pattern image 210 having pixels of red (R), green (G), blue (B), and NIR channels at equal ratios of 1:1:1:1 in the same unit pixel, into a quincuncial pattern image 220 based on difference values in a diagonal pixel direction. The quincuncial pattern image 220 is a pattern image having the same geometric model as and different channel values from a Bayer pattern image.

The MFA pattern image 210 is converted into the quincuncial pattern image 220 in order to apply an existing color interpolation algorithm to an R, G, B, and NIR channel interpolation method according to the exemplary embodiments by approximating the MFA pattern image 210 with a Bayer pattern. A detailed description of a process of forming the quincuncial pattern image 220 will be provided below with reference to FIG. 2.

If the MFA pattern image 210 is converted into the quincuncial pattern image 220, the adaptive interpolation unit 110 interpolates color channels and an NIR channel of the MFA pattern image 210 to a maximum resolution, based on difference values in vertical and horizontal pixel directions of the converted quincuncial pattern image 220. A detailed description thereof will be provided below with reference to FIG. 3.

The frequency compensation unit 120 obtains a high-resolution MFA image by using high-frequency and medium-frequency components of a high-resolution base image, corresponding to high-frequency and medium-frequency components of a low-resolution MFA image interpolated by the adaptive interpolation unit 110.

After that, color distortion between channels is removed, based on linear regression analysis in consideration of energy levels of channels in the high-resolution MFA image obtained by the frequency compensation unit 120.

In more detail, color distortion between channels is removed by strongly reconstructing high-frequency components of a channel having a high energy level of high-frequency components, and weakly reconstructing high-frequency components of a channel having a low energy level of high-frequency components, so as to allow edges of channels to be uniform, based on linear regression analysis in consideration of energy levels of channels. A detailed description of the frequency compensation unit 120 will be provided below with reference to FIGS. 4 through 13.

The channel interference suppression unit 130 removes color distortion generated between each channel of the high-resolution MFA image generated by the frequency compensation unit 120, and another channel of the high-resolution MFA image and a base channel by using a weighted average of pixel value differences between each channel of the high-resolution MFA image, and the other channel of the high-resolution MFA image and the base channel.

Even after the adaptive interpolation unit 110 illustrated in FIG. 1 obtains a low-resolution MFA image by reconstructing a resolution with respect to each channel of an MFA pattern image, and the frequency compensation unit 120 illustrated in FIG. 1 performs high-frequency and medium-frequency compensation, false color artifacts may remain due to aliasing. For example, multiple colors may remain on a texture pattern, a fine detail, a strong edge, or text.

In order to remove such color distortion, as illustrated in FIGS. 15 through 18, the channel interference suppression unit 130 suppresses color interference between R, G, B, and NIR channels of the high-resolution MFA image by using a weighted average of pixel value differences between each channel of the high-resolution MFA image, and another channel of the high-resolution MFA image and a base channel.

FIG. 2 is a diagram showing an example of converting the MFA pattern image 210 into the quincuncial pattern image 220. A process of converting the MFA pattern image 210 into the quincuncial pattern image 220 is represented by Equation 1 below:

[Equation 1]

$$N_{m,n} = \frac{\sum_{l,j \in S_N} w_{m+l,n+j} N_{m+l,n+j}}{\sum_{l,j \in S_N} w_{m+l,n+j}} + C_{m,n}^{R,N} \frac{\sum_{l,j \in S_R} w_{m+l,n+j} \{R_{m,n} - R_{m+l,n+j}\}}{\sum_{l,j \in S_R} w_{m+l,n+j}},$$

In order to interpolate a channel value at a center pixel (m,n) of the MFA pattern image 210, a sum of a first weighted average of values of pixels 211, 212, 213, and 214, spaced apart from the center pixel (m,n) of the MFA pattern image 210 by one pixel in a diagonal direction, and a second weighted average obtained by calculating a weighted average of difference values between the center pixel (m,n) of the MFA pattern image 210 and pixels 221, 222, 223, and 224, spaced apart from the center pixel (m,n) of the MFA pattern image 210 by two pixels in a diagonal direction, is used.

As illustrated in FIG. 2, in order to interpolate an NIR channel value 210 of the location (m,n), a weighted sum of values of the pixels 211, 212, 213, and 214 spaced apart from the location (m,n) by one pixel in a diagonal direction is calculated, a weighted sum of difference values between an R channel value 210 and its peripheral R channel values 221, 222, 223, and 224 is calculated as in an existing color interpolation algorithm, and the weighted sums are summed to ultimately obtain an interpolation value of an NIR channel.

In Equation 1, $C_{m,n}^{R,N}$ is a value for reflecting correlations between the R channel and the NIR channel. According to an embodiment of the exemplary embodiments, the value of $C_{m,n}^{R,N}$ is set as 0.5. A method of calculating a weight $w_{m+2, n+2}$ of a peripheral pixel, spaced apart from a pixel to be interpolated, by two pixels in a diagonal direction, is represented by Equation 2 below, and is similar to an existing color interpolation algorithm:

$$N_{m,n} = \begin{cases} \sum_{i,j \in S_N} w_{m+i,n+j} N_{m+i,n+j} + \\ C_{m,n}^{R,N} \sum_{i,j \in S_R} w_{m+i,n+j} \{R_{m,n} - R_{m+i,n+j}\}, \\ \sum_{i,j \in S_N} w_{m+i,n+j} N_{m+i,n+j} + \\ 2C_{m,n}^{R,N} \sum_{i,j \in S_R} w_{m+i,n+j} \{R_{m,n} - \frac{R_{m+i,n} + R_{m,n+j}}{2}\}, \end{cases}$$

$$w_{m+l,n+j} = \frac{1}{1 + |R_{m+l,n+j} - R_{m,n}| + |N_{m+1,n+1} - N_{m+1,n+1}| + } \quad [\text{Equation 2}]$$
$$\frac{|G_{m+1+j,n+j} - G_{m+1,n}|}{2} + \frac{|B_{m+1,n+1+j} - B_{m,n+1}|}{2}$$

In Equation 2, R, G, and B refer to color channels of the MFA pattern image 210, and N refers to an NIR channel of the MFA pattern image 210.

Referring to Equation 2, the weight $w_{m+2, n+2}$ is increased in an inverse proportion to a difference value in each pixel direction. In other words, if a difference value in a pixel direction where a weighted sum is to be calculated is large, the direction is determined as an edge, a weight is reduced, and the edge is prevented from being dull during an interpolation process.

In Equation 2, the difference value in the pixel direction where the weighted sum is to be calculated is $$|R_{m+2,n+2} - R_{m,n}|, |N_{m+1,n+1} - N_{m-1,n-1}|, \frac{|G_{m+1,n+2} - G_{m+1,n}|}{2},$$
$$\text{or } \frac{|B_{m+2,n+1+2} - B_{m,n+1}|}{2}.$$

This difference value is large if an edge exists in the pixel direction where the weighted sum is to be calculated, and is small if an edge does not exist.

When $w_{m+2, n+2}$ is calculated, since the difference value is inversely proportional to a denominator, if an edge exists, the difference value is increased and the weight $w_{m+2, n+2}$ is reduced. Otherwise, if an edge does not exist, the difference value is reduced and the weight $w_{m+2, n+2}$ is increased. As such, when an ultimate weighted sum is calculated, an edge is prevented from being dull.

According to another embodiment of the exemplary embodiments, when the MFA pattern image 210 is converted into the quincuncial pattern image 220, directivity of an edge may be adaptively considered.

$$\frac{|R_{m,n} - R_{m+i,n+j}|}{2} < |R_{m+i,n} - R_{m,n+j}| \quad [\text{Equation 3}]$$

otherwise

Referring to Equation 3, if a pixel value difference in a diagonal direction is less than twice a pixel value difference in an inverse diagonal direction, a diagonal direction is determined as a non-edge and interpolation is performed in a diagonal direction based on Equations 1 and 2.

However, if a pixel value difference in a diagonal direction is equal to or greater than twice a pixel value difference in an inverse diagonal direction, a diagonal direction is determined as an edge, and an average $$\frac{R_{m+i,n} + R_{m,n+j}}{2}$$

the pixel values in an inverse diagonal direction is used as the pixel values in a diagonal direction.

Although $C_{m,n}^{R,N}$ is used if a pixel value difference in a diagonal direction is less than twice a pixel value difference in an inverse diagonal direction, it may be set to use $2*C_{m,n}^{R,N}$ if a pixel value difference in a diagonal direction is equal to or greater than twice a pixel value difference in an inverse diagonal direction.

Figure 3:
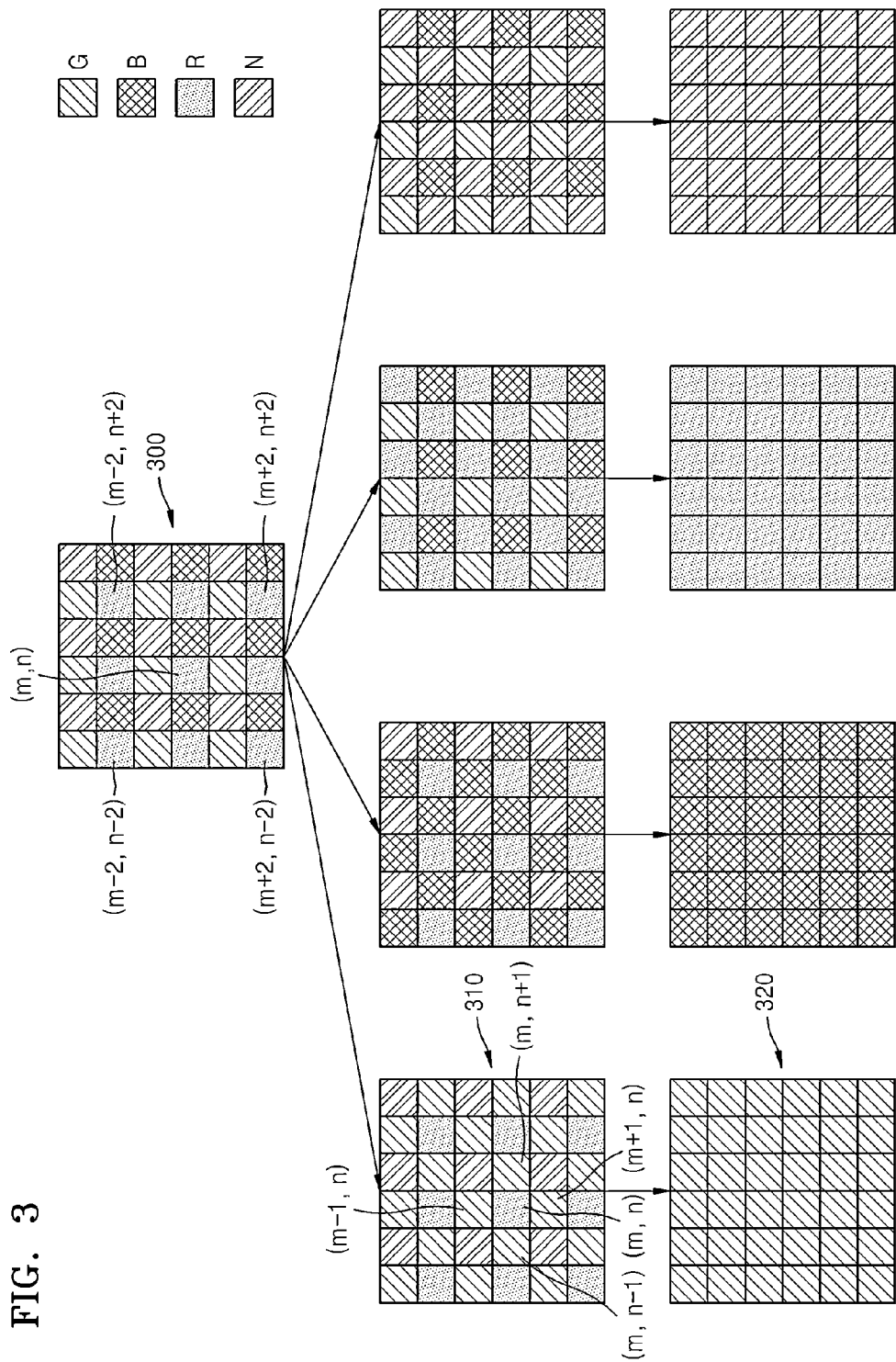
FIG. 3 is a diagram showing a process of interpolating color channels and a near infrared (NIR) channel of an MFA pattern image to a maximum resolution.

FIG. 3 is a diagram showing a process of interpolating color channels and an NIR channel of an MFA pattern image 300 to a maximum resolution.

The adaptive interpolation unit 110 illustrated in FIG. 1 converts the MFA pattern image 300 into quincuncial pattern images 310 based on difference values in a diagonal pixel direction, and then converts the color channels and the NIR channel of the MFA pattern image 300 to a maximum resolution 320 based on difference values in vertical and horizontal pixel directions of the converted quincuncial pattern image 310.

A method of interpolating the MFA pattern image 300 into four quincuncial pattern images 310 based on the difference values in a diagonal pixel direction is represented by Equation 4 below:

$$N_{m,n} = \frac{\sum_{i,j \in S_N} w_{m+i,n+j} \cdot N_{m+i,n+j}}{\sum_{i,j \in S_N} w_{m+i,n+j}} + C_{m,n}^{R,N} \cdot \frac{\sum_{i,j \in S_R} w_{m+i,n+j}\{R_{m,n} - R_{m+i,n+j}\}}{\sum_{i,j \in S_N} w_{m+i,n+j}}$$ [Equation 4]

SN={(−1,1), (−1,1), (1,−1), (1,1)}
SR={(−2,2), (−2,2), (2,−2), (2,2)}
NW: (−1,−1), (−2,−2),
NE: (−1,1), (−2,2),
SW: (1,−1), (2,−2),
SE: (1,1), (2,2)

A weighted average of four pixel values in northwest (NW), northeast (NE), southwest (SW), and southeast (SE) directions in the shape of ×, with respect to a center pixel value to be interpolated, is calculated and is filled as the center pixel value. In this manner, a channel value (e.g., a G channel value) of a location (m,n) is filled as a weighted average of four adjacent G pixel values in NW, NE, SW, and SE directions in the shape of x, such that an interpolation result of an image 310 in which the G channel is filled with a quincuncial pattern like a chessboard is preliminarily generated.

The above process is also performed on a channel value (e.g., an R channel value) of a location (m+1,n), such that an interpolation result of an image 310 in which the R channel is filled with a quincuncial pattern like a chessboard is preliminarily generated.

The above process is further performed on a channel value (e.g., a B channel value) of a location (m,n+1) and a channel value (e.g., an N channel value) of a location (m+1,n+1) such that interpolation results of images 310 each filled with a quincuncial pattern like a chessboard are preliminarily generated. In this case, a weight wm+i, n+j is calculated as represented by Equation 2.

A method of interpolating the image 310 into an image 320 is represented by Equation 5 below:

$$N_{m,n} = \frac{\sum_{i,j \in S_N} w_{m+i,n+j} \cdot N_{m+i,n+j}}{\sum_{i,j \in S_N} w_{m+i,n+j}} + C_{m,n}^{R,N} \cdot \frac{\sum_{i,j \in S_R} w_{m+i,n+j}\{R_{m,n} - R_{m+i,n+j}\}}{\sum_{i,j \in S_R} w_{m+i,n+j}},$$ [Equation 5]

$S_N$={(−1,0), (1,0), (0,−1), (0,1)}
$S_R$={(−2,0), (2,0), (2,−2), (2,2)}
N: (−1,0), (−2,0),
S: (1,0), (2,0),
W: (0,−1), (0,−2),
E: (0,1), (0,2)

A weighted average of four pixel values in NW, NE, SW, and SE directions in the shape of +, with respect to a center pixel value to be interpolated, is calculated and is filled as the center pixel value. In this case, a weight $w_{m+i, n+j}$ is calculated as represented by Equation 2.

FIGS. 4 through 8 are diagrams showing a process of generating a high-resolution MFA image by interpolating color channels and an NIR channel of an MFA pattern image to a maximum resolution, in the frequency compensation unit 120 illustrated in FIG. 1, according to an embodiment of the exemplary embodiments.

The frequency compensation unit 120 obtains a high-resolution MFA image by using high-frequency and medium-frequency components of a high-resolution base image, corresponding to high-frequency and medium-frequency components of a low-resolution MFA image interpolated by the adaptive interpolation unit 110 illustrated in FIG. 1. Each channel image is split into and considered as low-frequency, medium-frequency, and high-frequency components. In order to process high-frequency and medium-frequency components, of which frequency information is damaged, adaptively to vertical, horizontal, and diagonal directions, a filter for filtering the high-frequency and medium-frequency components according to vertical and horizontal directions are used.

The frequency compensation unit 120 splits each of low-resolution MFA images 410, 420, 430, and 440 interpolated by the adaptive interpolation unit 110 and a high-resolution base image 400, into high-frequency, medium-frequency, and low-frequency components (S400 and S410).

An example of splitting high-frequency components will now be described with reference to FIGS. 5A, 6A, and 6B.

Figure 5A:
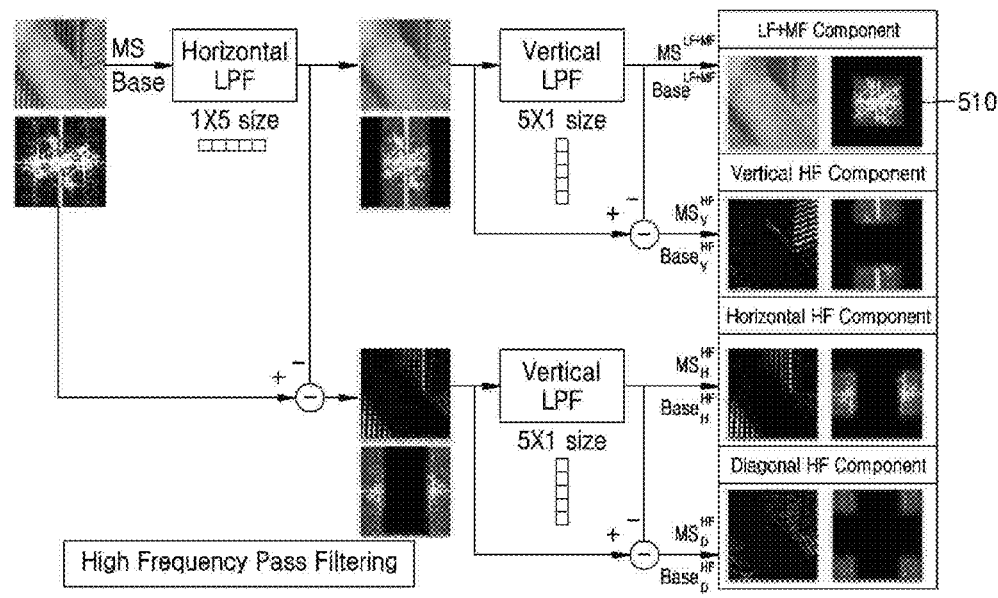
Figure 6A:
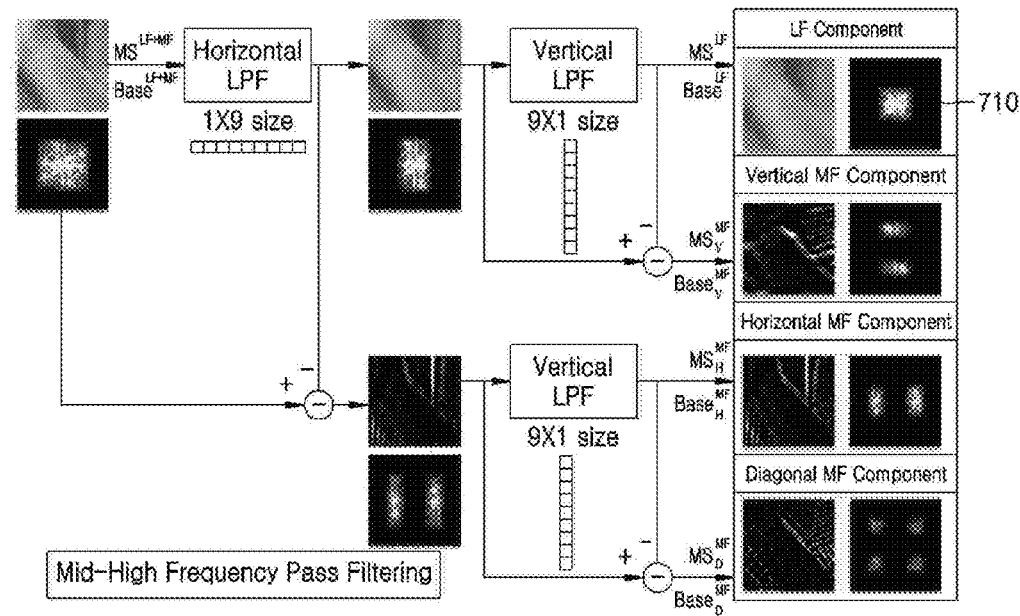

In FIG. 5A, high-frequency components are initially split from a multispectral (MS) image. First, an input image is passed through a horizontal low-pass filter (LPF). The filtered image passed through the horizontal LPF is an image from which high-frequency components in a horizontal direction are filtered, and in which only medium-frequency and low-frequency components remain. Accordingly, an image obtained by subtracting the filtered image from the input image is an image including only the high-frequency components in a horizontal direction. In other words, by using a horizontal LPF, a horizontal high-frequency image and a horizontal medium-frequency and low-frequency image may be separated from each other.

After that, if the horizontal medium-frequency and low-frequency image is passed through a vertical LPF, a vertical and horizontal medium-frequency and low-frequency image and a vertical high-frequency image (vertical high-frequency components) may be separated from each other.

If the separated horizontal high-frequency image is passed through a vertical LPF, an exclusively horizontal high-frequency image (horizontal high-frequency components) and a vertical and horizontal high-frequency image (diagonal high-frequency components) may be separated from each other.

Therefore, an initial input image may be passed through a horizontal LPF and a vertical LPF so as to be split into four types of components. such as medium-frequency and low-frequency components, vertical high-frequency components, horizontal high-frequency components, and diagonal high-frequency components. The four types of components, split from the input image, are represented by the following Equation below:

$MS^{LF+MF}$=MS−(MS∗$LPF_H^{HF}$)−((MS−(MS∗$LPF_H^{HF}$))∗$LPF_V^{HF}$)

$MS_H^{HF}$=(MS∗$LPF_H^{HF}$)−((MS∗$LPF_H^{HF}$)∗$LPF_V^{HF}$)

$MS_V^{HF}=(MS-(MS*LPF_H^{HF}))*LPF_V^{HF}$ $MS_D^{HF}=(MS*LPF_H^{HF})*LPF_V^{HF}$

The frequency compensation unit 120 splits each of the low-resolution MFA images 410, 420, 430, and 440 and the high-resolution base image 400 into vertical high-frequency components, horizontal high-frequency components, diagonal high-frequency components, and low-frequency+medium-frequency components by using a 1×5 horizontal LPF and a 5×1 vertical LPF.

Figure 5B:
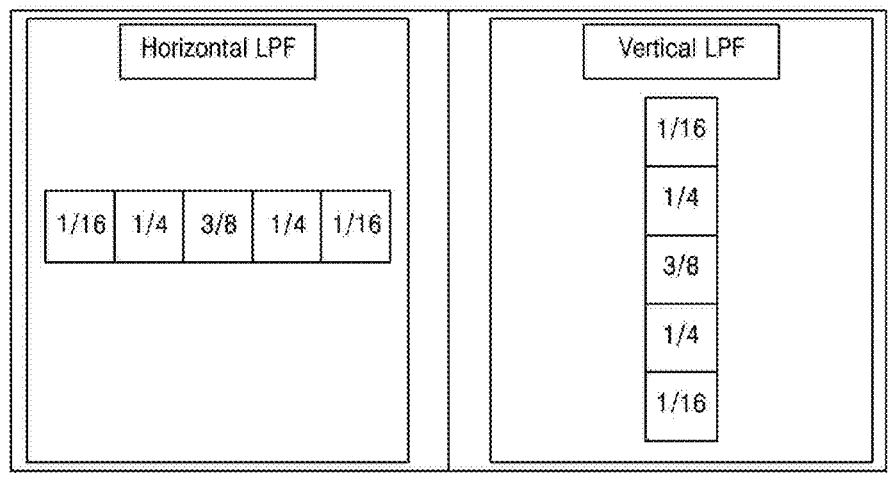

In this case, coefficients of the 1×5 horizontal LPF and the 5×1 vertical LPF may be set as FIG. 5B. However, the coefficients shown in FIG. 5B are provided only as an example and may vary.

An embodiment of separating medium-frequency components, after high-frequency components are completely separated, is illustrated in FIGS. 6A, 6B, 7, and 8. The frequency compensation unit 120 splits each of the low-resolution MFA images 410, 420, 430, and 440 and the high-resolution base image 400, from which the high-frequency components are separated and medium-frequency and low-frequency components are mixed, into vertical medium-frequency components, horizontal medium-frequency components, diagonal medium-frequency components, and low-frequency components.

Like the process preformed on a high-frequency region, vertical medium-frequency components, horizontal medium-frequency components, and diagonal medium-frequency components of an image are separated from low-frequency components of the image by passing the image through a horizontal LPF and a vertical LPF and obtaining difference images.

Consequently, an image of medium-frequency and low-frequency components may be split into four types of components, such as low-frequency components, vertical medium-frequency components, horizontal medium-frequency components, and diagonal medium-frequency components. The four types of components split from an input image are represented by the following Equation below:

$MS^{LF}=MS^{LF+MF}-(MS^{LF+MF}*LPF_H^{HF})-((MS^{LF+MF}-(MS^{LF+MF}*LPF_H^{HF}))*LPF_V^{MF})$ $MS_H^{MF}=(MS^{LF+MF}*LPF_H^{HF})-((MS^{LF+MF}*LPF_H^{MF})*LPF_V^{MF})$ $MS_V^{MF}=(MS^{LF+MF}-(MS^{LF+MF}*LPF_H^{HF}))*LPF_V^{MF}$ $MS_D^{MF}=(MS^{LF+MF}*LPF_H^{MF})*LPF_V^{MF}$

Figure 6B:
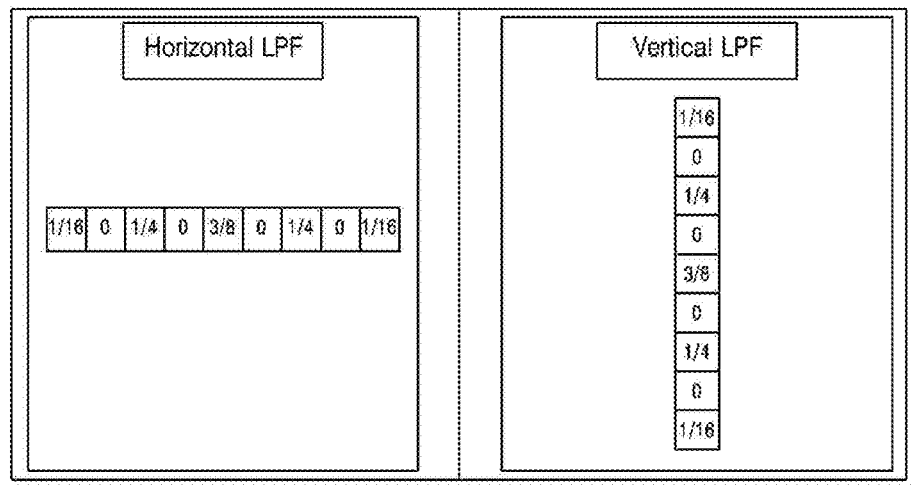

In this case, coefficients of a 1×9 horizontal LPF and a 9×1 vertical LPF may be set as FIG. 6B. However, the coefficients shown in FIG. 6B are provided as an example, and may vary.

Figure 7:
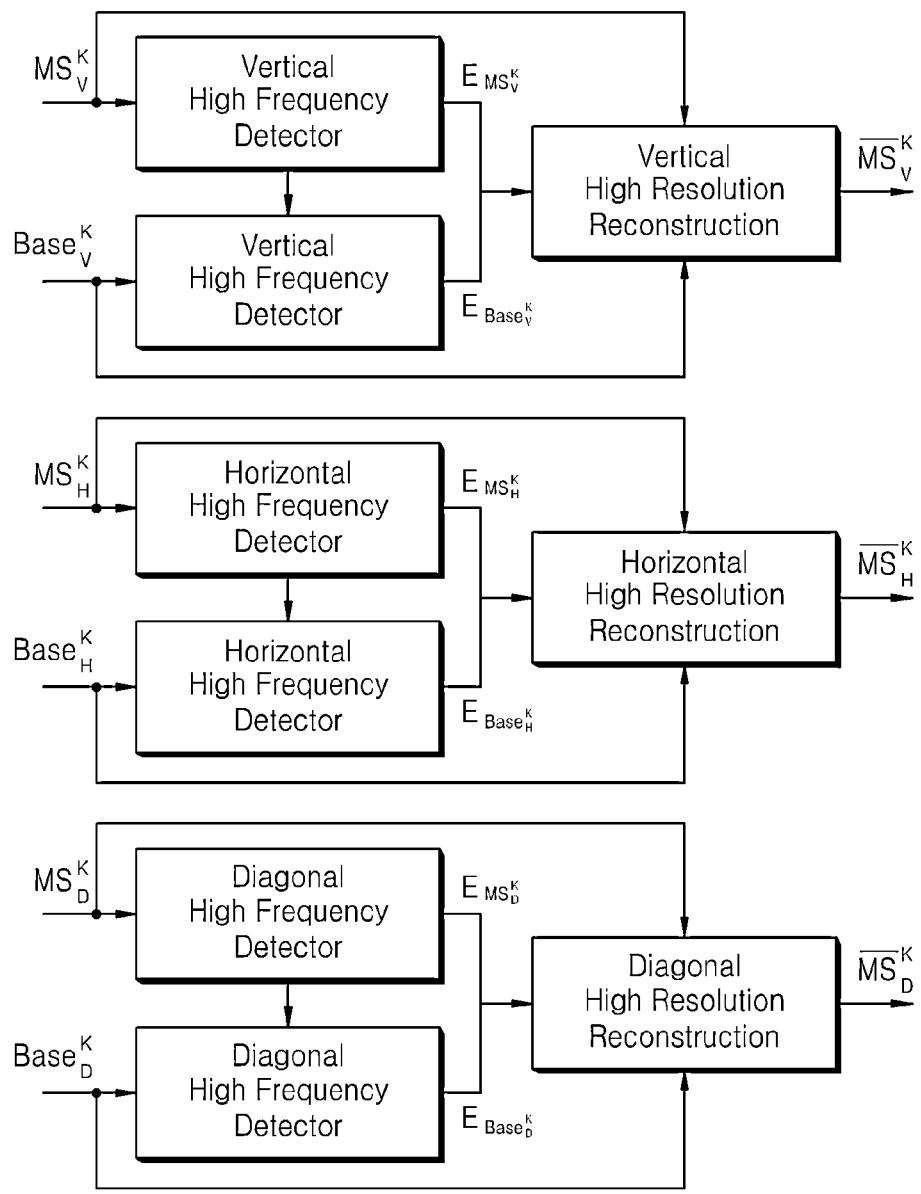
FIG. 7 is a diagram showing an example of reconstructing directional frequency components by using a base channel.

FIG. 7 is a diagram showing an example of reconstructing directional frequency components by using a base channel.

High-resolution MFA images 411, 421, 431, and 441, e.g., $\overline{MS}_F^{HF}$, $\overline{MS}_H^{HF}$, $\overline{MS}_D^{HF}$, $\overline{MS}_F^{MF}$, $\overline{MS}_H^{MF}$, $\overline{MS}_D^{MF}$, are obtained using high-frequency components $Base_V^{HF}$, $Base_H^{HF}$, and $Base_D^{HF}$, and medium-frequency components $Base_V^{MF}$, $Base_H^{MF}$, and $Base_D^{MF}$ of the high-resolution base image 400 corresponding to high-frequency components $MS_V^{HF}$, $MS_H^{HF}$, and $MS_D^{HF}$, and medium-frequency components $MS_V^{MF}$, $MS_H^{MF}$, and $MS_D^{MF}$ of the MFA images 410, 420, 430, and 440 passed through a high-frequency detector.

Figure 8:
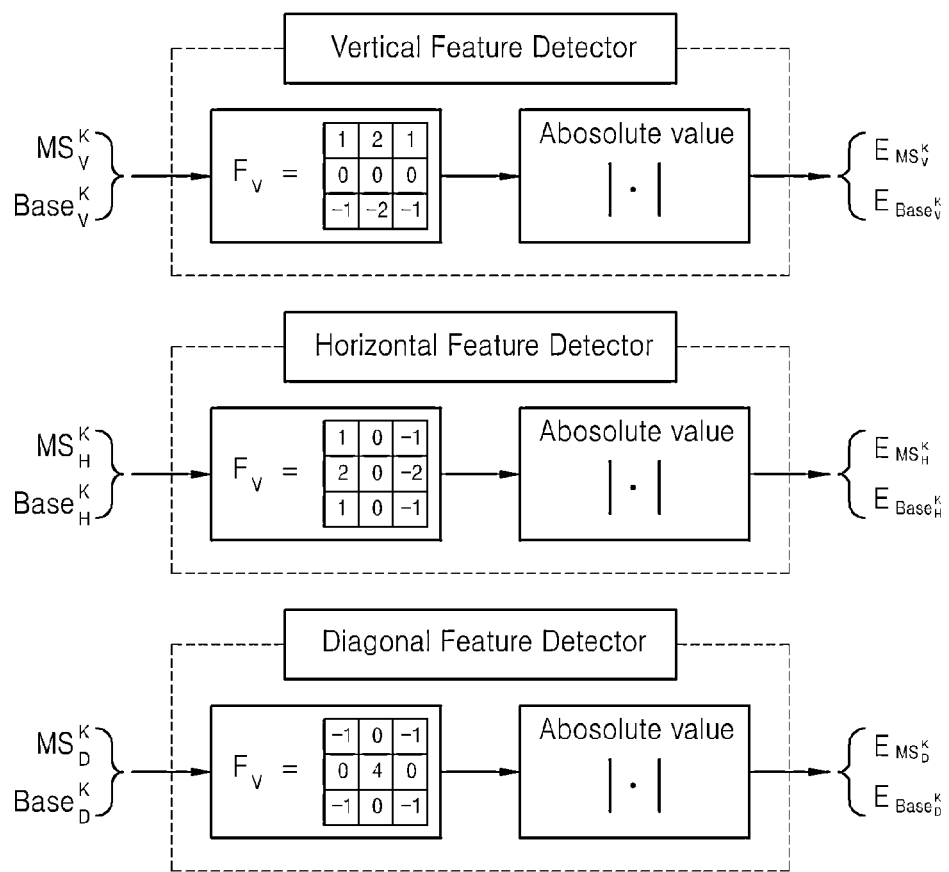
FIG. 8 is a diagram showing an example of detecting features in each channel.

Referring to FIG. 8 showing an example of detecting features in each of horizontal, vertical, and diagonal directions, energy values En are extracted by passing high-frequency and medium-frequency components of an MFA image (MS image) and a base image through the high-frequency detector (S420). The extracted energy values En of the MFA image and the base image are compared in vertical, horizontal, and diagonal directions with respect to each frequency component and then a weighted sum is calculated as represented by Equation 6 below. The high-resolution MFA images 411, 421, 431, and 441 are obtained by reconstructing medium-frequency and high-frequency components of an MFA image.

$$\begin{cases} C_{MS_d^k}(i,j) = \dfrac{E_{MS_d^k}(i,j)}{E_{MS_d^k}(i,j)+E_{Base_d^k}(i,j)}, & \text{if } E_{MS_d^k}(i,j) \le E_{Base_d^k}(i,j) \\ C_{MS_d^k}(i,j) = 1, & \text{otherwise} \end{cases}$$ [Equation 6]

$C_{Base_d^k}(i,j) = 1 - C_{MS_d^k}(i,j)$ $\overline{MS}_d^k(i,j) = C_{MS_d^k}(i,j) \cdot MS_d^k(i,j) + C_{Base_d^k}(i,j) \cdot Base_d^k(i,j)$ $k \in \{MF, HF\}$ $d \in \{\text{Horizontal, Vertical, Diagonal}\}$ Equation 6 is based on a color difference model on the assumption that high-frequency components are the same between channels. According to an embodiment of the exemplary embodiments, as represented by Equation 6, damaged medium-frequency and high-frequency components of an MFA image are reconstructed by substituting them with medium-frequency and high-frequency components of a high-resolution base image, or by calculating a weighted sum.

In this case, weights $C_{MSd}^k(I,j)$ and $C_{Based}^k(,j)$ are respectively provided to medium-frequency and high-frequency components of a low-resolution MFA image and medium-frequency and high-frequency components of a base image, and are set in such a way that a large weight is provided to an edge of the low-resolution MFA image or an edge of the base image, whichever has a higher energy level.

C=R, G, B, and N, k=medium-frequency MF and high-frequency HF, and dir=vertical, horizontal, and diagonal components of an MS image. MS^k,dir and a base image Base^k,dir are passed through individual detectors to calculate local energy levels in each direction, their intensities are compared. Thus, weight coefficients C_MS^k,dir and C_Base^k,dir of the MS image and the base image are calculated, as described above.

High-frequency components of the MS image have intensities generally less than those of an original signal. Accordingly, if a local energy level E_MS^k,dir of the MS image is less than a local energy level E_Base^k,dir of the base image, an appropriate ratio, e.g., E_MS^k,dir/(E_MS^k,dir+E_Base^k,dir), is calculated according to a ratio between local energy levels, is multiplied by each directional frequency component of the MS image and the base image, and a weighted sum is obtained. Thus, an ultimate image bar_MS^k,dir(i,j) is calculated.

Alternatively, if the local energy level E_MS^k,dir of the MS image MS^k,dir is greater than the local energy level E_Base^k,dir of the base image, since aliasing is most likely generated on the MS image MS^k,dir, the ultimate image bar_MS^k,dir(i,j) of which high-frequency components are compensated, is calculated using only frequency components of the base image Base^k,dir, without reflecting frequency components of the MS image MS^k,dir by setting the weight coefficient C_MS^k,dir to 0

Figure 9:
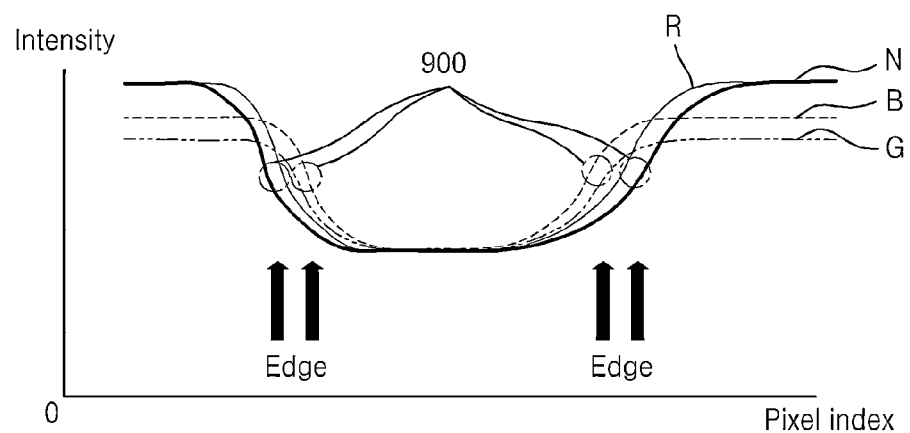
FIGS. 9 and 10 are graphs showing a problem generated when the frequency compensation unit simply applies a color difference model to an MFA image.
Figure 10:
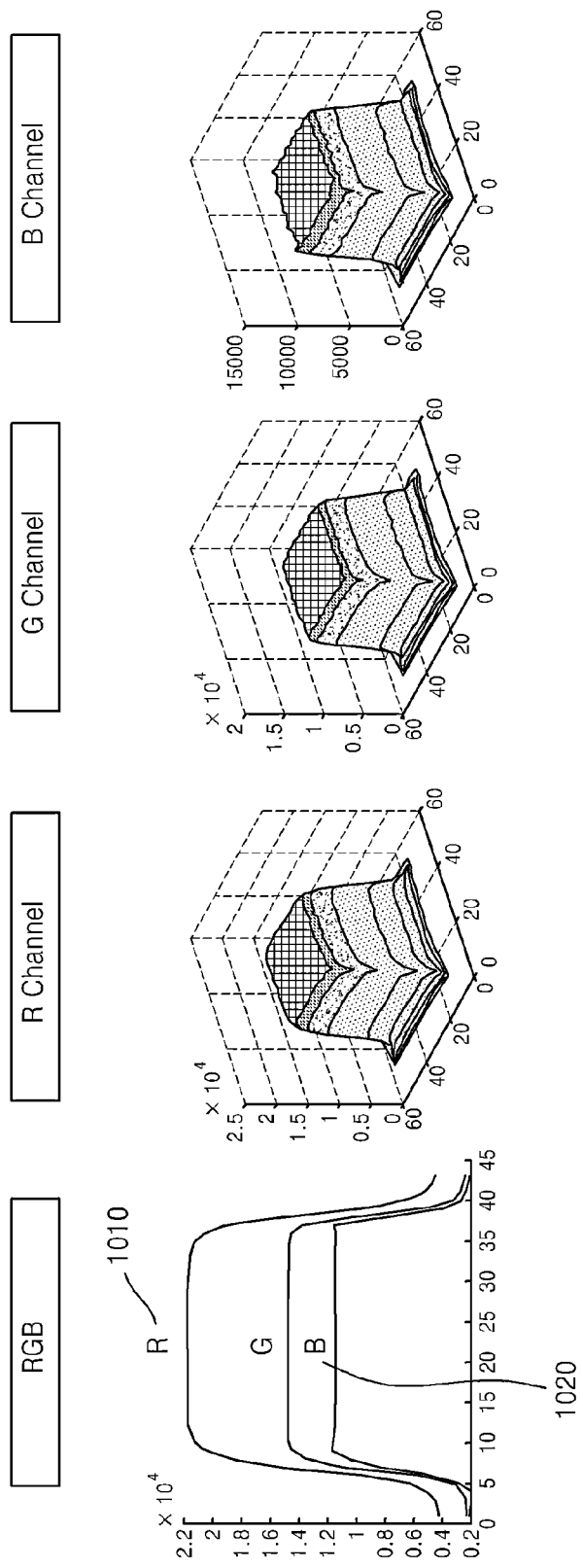

FIGS. 9 and 10 are graphs showing a problem generated when the frequency compensation unit 120 applies a color difference model to an MFA image.

According to an embodiment of the exemplary embodiments, since an MFA image using a wide NIR band equal to or greater than 700 nm is used, if a color difference model is simply applied, a problem may be generated (described below), which is not generated in an existing Bayer color filter array (CFA).

As illustrated in FIG. 9, on an image having a rapid edge where an energy level difference between channels is greatly large, e.g., a color chart image, since a difference between refractive indices of R, G, B, and NIR channels, which are passed through an optical system, is large, if a color difference model is applied to perform interpolation, artifacts 900, e.g., a shooting phenomenon, may be generated.

FIG. 10 shows an overshoot phenomenon on a color patch.

FIG. 10 shows an image of one patch of a color chart and also shows that an energy level of an R channel 1010 is relatively higher than those of the other channels. A B channel 1020 has the lowest energy level.

Since a rapid edge is formed at a boundary of the color chart, if high-frequency components having the same energy levels are reconstructed by applying a color difference model without considering an energy level difference, high-frequency components near an edge of the R channel 1010 having a relatively high energy level are not sufficiently compensated, and become smooth, and high-frequency components of the B channel 1020 having a low energy level are excessively compensated to cause overshoot. Therefore, non-uniform edges are formed between channels, and a shooting phenomenon is generated near an edge, in a subsequent color reconstruction process.

In order to solve this problem, according to an embodiment of the exemplary embodiments, the channel interference suppression unit 130 illustrated in FIG. 1 removes color distortion between channels using linear regression analysis, in consideration of energy levels of channels in the high-resolution MFA image obtained by the frequency compensation unit 120 illustrated in FIG. 1.

Figure 11:
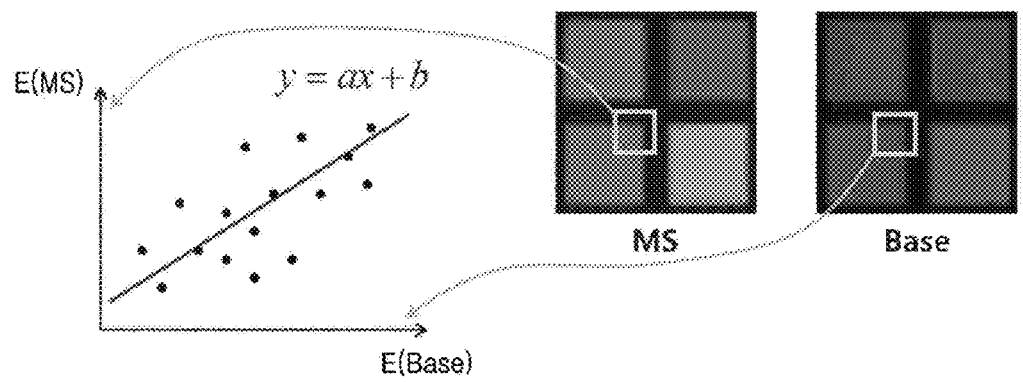
FIG. 11 is a graph for describing a method of suppressing color distortion by using linear regression analysis in the frequency compensation unit, according to an embodiment.

FIG. 11 is a graph for describing a method of suppressing color distortion using linear regression analysis, in the frequency compensation unit 120, according to an embodiment of the exemplary embodiments.

In FIG. 11, an x axis represents energy of a frequency region of an MFA image including medium-frequency and high-frequency components, and a y axis represents energy of a frequency region of a base image including medium-frequency and high-frequency components. In other words, an energy value of a base image in a small local window of 5*5 is represented on the x axis and an energy value of an MS image is represented on the y axis. Therefore, the energy values are mapped on a two-dimensional plane.

It is assumed that the base image and the MS image have linearly proportional correlations in the local window. A ratio between energy levels of medium-frequency and high-frequency components of the MS image and the base image may be calculated as a linear slope (y=ax+b).

A linear slope a may be calculated, as represented by Equation 7 below:

$$\begin{bmatrix} E\{MS^{MF+HF}\} \\ E\{MS^{MF+HF} \cdot Base^{MF+HF}\} \end{bmatrix} = \begin{bmatrix} E\{Base^{MF+HF}\} & 1 \\ E\{Base^{MF+HF} \cdot Base^{MF+HF}\} & E\{Base^{MF+HF}\} \end{bmatrix} \cdot \begin{bmatrix} a \\ b \end{bmatrix}$$

$$a = \frac{E\{Base^{MF+HF}\} \cdot E\{MS^{MF+HF}\} - E\{MS^{MF+HF} \cdot MS^{MF+HF}\}}{E\{Base^{MF+HF}\} \cdot E\{Base^{MF+HF}\} - E\{Base^{MF+HF} \cdot Base^{MF+HF}\}}$$

[Equation 7]

Figure 4:
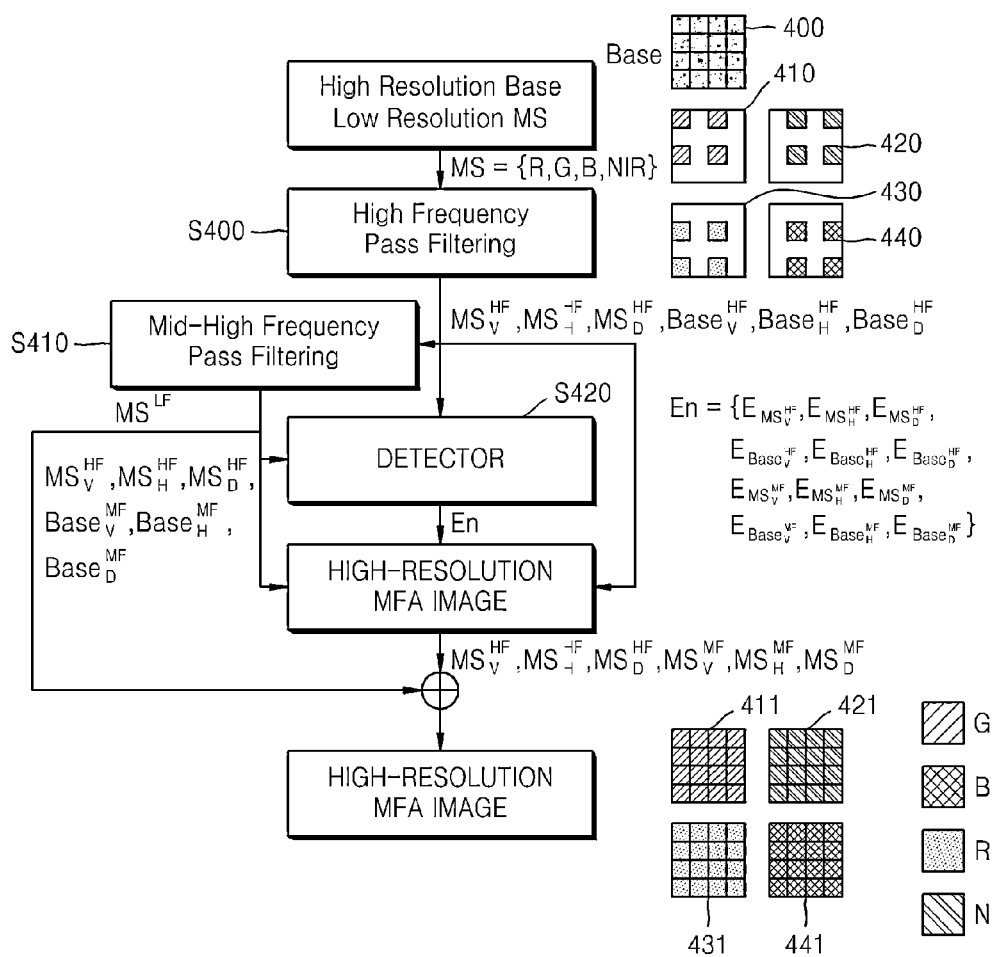
FIGS. 4 through 6 are diagrams showing a process of generating a high-resolution MFA image by interpolating color channels and an NIR channel of an MFA pattern image to a maximum resolution, in a frequency compensation unit, according to an embodiment.

In operation S420 for extracting the energy value En in FIG. 4, medium-frequency and high-frequency components of an MFA channel may be reconstructed by additionally correcting an energy level difference between channels, as represented by Equation 8 below based on the linear slope a calculated by using linear regression analysis:

$$\begin{cases} C_{MS_{dir}^k}(i,j) = 1, & \text{if } 0 > a(i,j) \cdot E_{Base_{dir}^k}(i,j) \\ C_{MS_{dir}^k}(i,j) = \dfrac{E_{MS_{dir}^k}(i,j)}{E_{MS_{dir}^k}(i,j) + a(i,j) \cdot E_{Base_{dir}^k}(i,j)} & \text{if } E_{MS_{dir}^k}(i,j) \le a(i,j) \cdot E_{Base_{dir}^k}(i,j) \\ C_{MS_{dir}^k}(i,j) = 0, & \text{otherwise} \end{cases}$$

$$C_{Base_{dir}^k}(i,j) = 1 - C_{MS_{dir}^k}(i,j)$$

$$E_{Base_{dir}^k}(i,j) = E_{Base_{dir}^k}(i,j) \cdot [1111]^T \cdot k \in \{MF, HF\}, dir \in \{V, H, D\}$$

$$\overline{MS}_{dir}^k(i,j) = C_{MS_{dir}^k}(i,j) \cdot MS_{dir}^k(i,j) + C_{Base_{dir}^k}(i,j) \cdot a(i,j) \cdot Base_{dir}^k(i,j)$$

[Equation 8]

C=R, G, B, and N, k=medium-frequency MF and high-frequency HF, and dir=vertical, horizontal, and diagonal components of an MS image MS^k,dir and an a(i,j)-multiplied base image a(i,j)*Base^k,dir are passed through individual detectors to calculate local energy levels E_MS^k,dir and a(i,j)*E_Base^k,dir in each direction, their intensities are compared. Thus, weight coefficients C_MS^k,dir and C_Base^k,dir of the MS image MS^k,dir and the a(i,j)-multiplied base image a(i,j)*Base^k,dir are calculated, as described above.

Here, a(i,j) is value calculated by Equation 7, and refers to a value of a location (i,j) of an image. When the a(i,j)-multiplied base image a(i,j)*E_Base^k,dir is calculated, the base image a(i,j)*E_Base^k,dir is calculated in such a way that high-frequency components of the base image a(i,j)*E_Base^k,dir are appropriately corrected for high-frequency components of the MS image (MS^k,dir), in order to prevent removal of color distortion.

High-frequency components of the MS image (MS^k,dir) have intensities less than those of an original signal. Accordingly, if the local energy level (E_MS^k,dir) of the MS image (MS^k,dir) is less than the local energy level a(i,j)*E_Base^k,dir of the a(i,j)-multiplied base image (a(i,j)*E_Base^k,dir), an appropriate ratio, e.g., E_MS^k,dir/(E_MS^k,dir+a(i,j)*E_Base^k,dir), is calculated according to a ratio between local energy levels, is multiplied by each directional frequency component of the MS image MS^k,dir and the a(i,j)-multiplied base image (a(i,j)*E_Base^k,dir), and a weighted sum is obtained. Therefore, an ultimate image bar_MS^k,dir (i,j) is calculated.

Otherwise, if the local energy level E_MS^k,dir of the MS image MS^k,dir is greater than the local energy level a(i,j)*E_Base^k,dir of the a(i,j)-multiplied base image a(i,j)*E_Base^k,dir, since aliasing is most likely generated on the MS image MS^k,dir, the ultimate image bar_MS^k,dir(i,j), of which high-frequency components are compensated is calculated, using only frequency components of the a(i,j)-multiplied base image (a(i,j)*Base^k,dir) without reflecting frequency components of the MS image MS^k,dir by setting the weight coefficient C_MS^k,dir to 0.

Finally, if the local energy level (a(i,j)*E_Base^k,dir) of the a(i,j)-multiplied base image is less than 0, since abnormal aliasing is already generated on the base image, the ultimate image (bar_MS^k,dir(i,j)), of which high-frequency components are compensated, is calculated using only frequency components of the MS image MS^k,dir without reflecting frequency components of the a(i,j)-multiplied base image (a(i,j)*Base^k,dir) by setting the weight coefficient C_MS^k, dir as 1.

Figure 12:
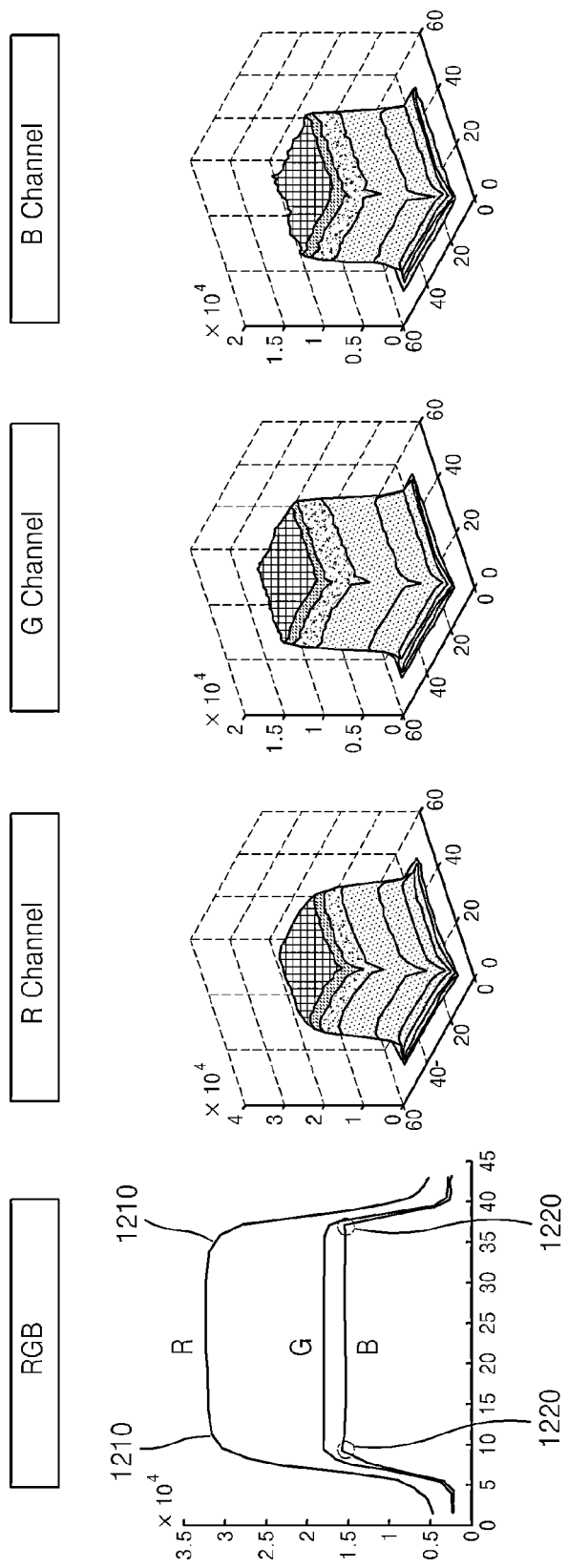
FIG. 12 is a graph showing a color patch image before energy levels of channels are corrected.

FIG. 12 is a graph showing a color patch image, before energy levels of channels are corrected.

If a color difference model is applied without considering an energy level difference between channels, medium-frequency and high-frequency components of an R channel having a high energy level are weakly reconstructed, and become smooth (1210). However, medium-frequency and high-frequency components of a B channel, having a relatively low energy level, are excessively reconstructed to cause overshoot (1220).

Figure 13:
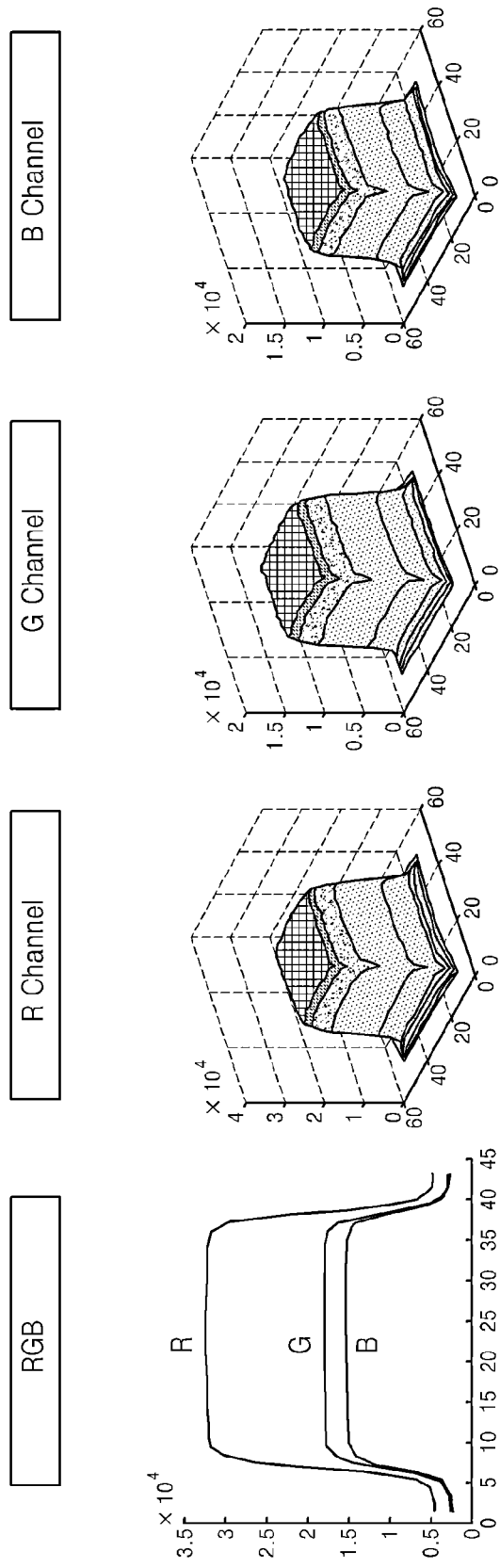
FIG. 13 is a graph showing an example of suppressing color distortion by correcting energy levels of channels by using linear regression analysis, according to an embodiment.

FIG. 13 is a graph showing an example of suppressing color distortion by correcting energy levels of channels using linear regression analysis, according to an embodiment of the exemplary embodiments.

According to an embodiment of the exemplary embodiments, on the MS image reconstructed by the channel interference suppression unit 130 illustrated in FIG. 1 in consideration of an energy level difference between channels applying linear regression analysis, since medium-frequency and high-frequency components of an R channel having a large energy level are strongly compensated and medium-frequency and high-frequency components of a B channel having a small energy level are weakly compensated, edges of channels may be uniformly formed. Thus, a problem such as overshoot may be solved.

Figure 14:
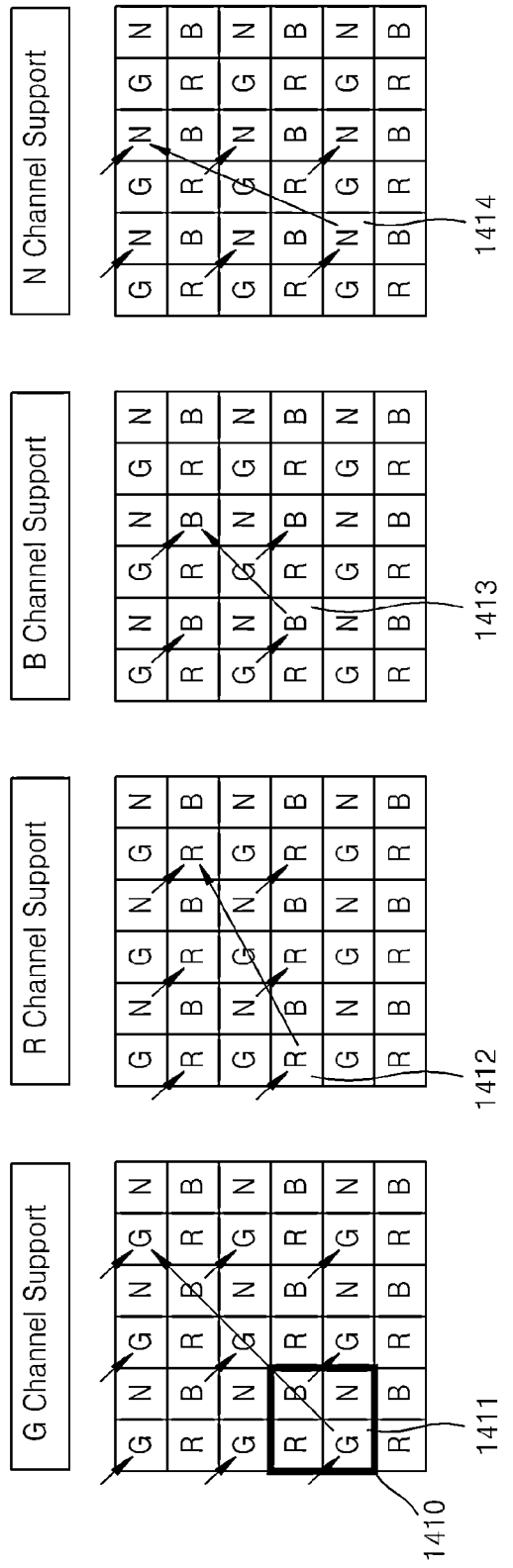
FIG. 14 is a diagram showing why channel interference is generated, according to an embodiment.

FIG. 14 is a diagram showing why channel interference is generated, according to an embodiment of the exemplary embodiments.

Even after the adaptive interpolation unit 110 illustrated in FIG. 1 reconstructs a resolution of each channel of an MFA pattern image to obtain a low-resolution MFA image, and the frequency compensation unit 120 illustrated in FIG. 1 compensates for high-frequency and medium-frequency components, false color artifacts due to aliasing may remain.

As illustrated in FIG. 14, whenever peripheral pixel values of a region 1410 are supported for interpolation between channels 1411, 1412, 1413, and 1414, locations of considered peripheral pixels are different, and channel information therebetween is also different, as represented by arrows of FIG. 14. Consequently, edge directions or high-frequency information, calculated by interpolating channels, are similar but slightly different, as represented by arrows of FIG. 14. Thus, channel interference is generated.

In order to solve this problem, according to an embodiment of the exemplary embodiments, as illustrated in FIGS. 15 through 18, interference in each of R, G, B, and NIR channels is suppressed. FIGS. 15 through 18 are conceptual diagrams showing a process of removing channel interference of each of R, G, B, and NIR channels.

Figure 15:
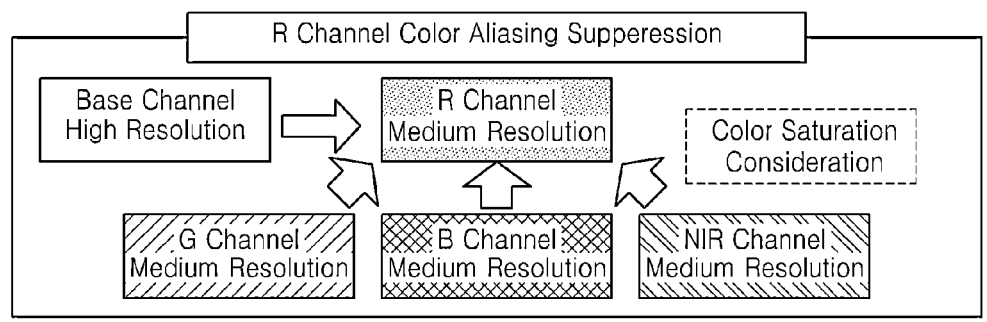
FIGS. 15 through 18 are conceptual diagrams showing a process of removing channel interference of each of R, G, B, and NIR channels.
Figure 16:
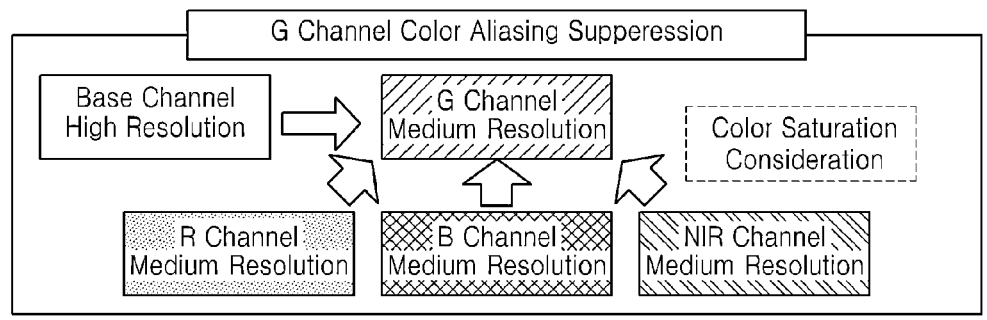
Figure 17:
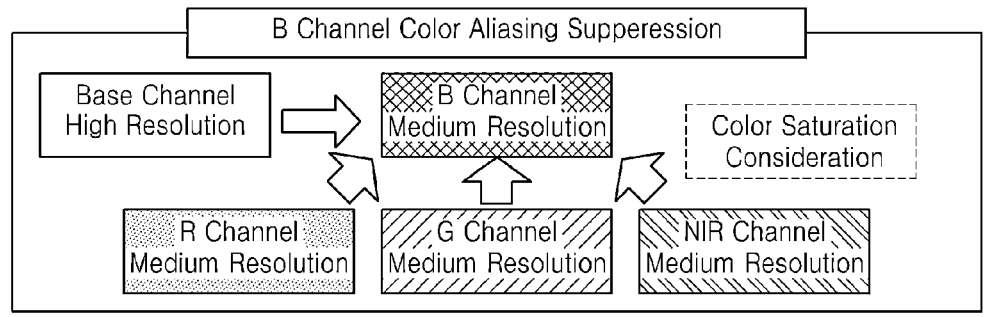
Figure 18:
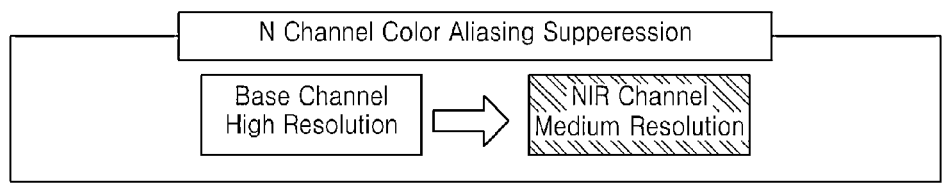

An example of suppressing channel interference of a G channel is described with reference to FIG. 15. Methods of suppressing channel interference of R, B, and NIR channels are substantially the same or similar to the G channel. Thus, detailed descriptions are not described here.

In order to suppress channel interference of the G channel, high-resolution base channel information and R, B, and NIR channel information are required. In this case, base channel values may be newly calculated, as represented by Equation 9 below:

$$Base_{m,n} = \frac{R_{m,n} + G_{m,n} + B_{m,n} + N_{m,n}}{4} \qquad [\text{Equation 9}]$$

Using the base channel information calculated by Equation 9, channel interference of a $G_{m,n}$ channel value may be suppressed, as represented by Equation 10 below. A basic process thereof is similar to a color interpolation algorithm. In other words, the process is based on the assumption that a value obtained by applying a weight α to a difference value between $G_{m+a,n+b}$ and $Base_{m+a,n+b}$ channel values equals an ultimate difference value between $G_{m,n}$ and $base_{m,n}$ channel values, of which channel interference is suppressed.

$$\overline{G}_{m,n} - Base_{m,n} = \sum_{(a,b)=S} \alpha_{m,n,m+a,n+b}(G - Base_{m+a,n+b}), \qquad [\text{Equation 10}]$$

$$\overline{G}_{m,n} = Base_{m,n} + \sum_{(a,b)=S} \alpha_{m,n,m+a,n+b}(G - Base_{m+a,n+b}),$$

In Equation 10, a weight $\alpha_{m,n,m+a,n+b}$ is calculated as represented by Equation 11 below:

$$\alpha_{m,n,m+a,n+b} = \frac{\sum_{(a,b)\in S,(a,b)=(0,0)} g(d^{Base,G}_{m+a,n+b} - d^{Base,G}_{m,n})}{1 + \sum_{(a,b)=S,(a,b)=(0,0)} g(d^{Base,G}_{m+a,n+b} - d^{Base,G}_{m,n})} \cdot \alpha_{m,n,m+0,n+0} \qquad [\text{Equation 11}]$$

In Equation 11, $d_{m,n}^{Base,G}$ and a function g(x) are defined as represented by Equation 12 below:

$$d_{m,n}^{Base,G} = G_{m+a,n+b} - Base_{m+a,n+b},$$ [Equation 12]

$$g(x) = \frac{1}{1+x}$$

According to an embodiment of the exemplary embodiments, in order to calculate an estimate $\overline{G}_{m,n}$ from which channel interference is removed, base, R, B, and NIR channel values are used, as represented by Equation 13 below:

$$\beta_{m,n}^{Base,G} = \frac{(\sigma_{m,n}^R)^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$ [Equation 13]

$$\beta_{m,n}^{R,G} = \frac{(\sigma_{m,n}^{Base})^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$

$$\beta_{m,n}^{B,G} = \frac{(\sigma_{m,n}^{Base})^2 + (\sigma_{m,n}^R)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$

$$\beta_{m,n}^{N,G} = \frac{(\sigma_{m,n}^{Base})^2 + (\sigma_{m,n}^R)^2 + (\sigma_{m,n}^B)^2}{3(\sigma_{m,n}^{Base})^2 + 3(\sigma_{m,n}^R)^2 + 3(\sigma_{m,n}^B)^2 + 3(\sigma_{m,n}^N)^2},$$

As represented by Equation 13, four estimates $\overline{G}_{m,n}^{Base}$, $\overline{G}_{m,n}^{R}$, $\overline{G}_{m,n}^{B}$, $\overline{G}_{m,n}^{N}$, from which channel interference generated between the G channel and the base, R, B, and NIR channels are removed are calculated, a weighted sum of the estimates are calculated. Then, an ultimate estimate, from which channel interference is suppressed, is calculated, as represented by Equation 14 below:

$$\overline{G}_{m,n} = \beta_{m,n}^{Base,G} \cdot \overline{G}_{m,n}^{Base} + \beta_{m,n}^{R,G} \cdot \overline{G}_{m,n}^{R} + \beta_{m,n}^{B,G} \cdot \overline{G}_{m,n}^{B} + \beta_{m,n}^{N,G} \cdot \overline{G}_{m,n}^{N}$$ [Equation 14]

In Equation 14, a weight $\beta_{m,n}^{Base,G}$, $\beta_{m,n}^{R,G}$, $\beta_{m,n}^{B,G}$, $\beta_{m,n}^{N,G}$ each channel is calculated, as represented by Equation 15 below:

$$\beta_{m,n}^{Base,G} = \frac{(\sigma_{m,n}^R)^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$ [Equation 15]

$$\beta_{m,n}^{R,G} = \frac{(\sigma_{m,n}^R)^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$

$$\beta_{m,n}^{B,G} = \frac{(\sigma_{m,n}^R)^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$

$$\beta_{m,n}^{N,G} = \frac{(\sigma_{m,n}^R)^2 + (\sigma_{m,n}^B)^2 + (\sigma_{m,n}^N)^2}{3(\sigma_{m,n}^{Base})^2 + 3(\sigma_{m,n}^R)^2 + 3(\sigma_{m,n}^B)^2 + 3(\sigma_{m,n}^N)^2},$$

In Equation 15, values of $\sigma_{m,n}^{Base}$, $\sigma_{m,n}^R$, $\sigma_{m,n}^B$, $\sigma_{m,n}^N$ are calculated, as represented by Equation 16 below:

$$\sigma_{m,n}^{Base} = \sum_{(a,b)\in S} \alpha_{m,n,m+a,n+b}(G_{m+a,n+b} - Base_{m+a,n+b}),$$ [Equation 16]

$$\sigma_{m,n}^{R} = \sum_{(a,b)\in S} \alpha_{m,n,m+a,n+b}(G_{m+a,n+b} - R_{m+a,n+b}),$$

$$\sigma_{m,n}^{B} = \sum_{(a,b)\in S} \alpha_{m,n,m+b,n+b}(G_{m+b,n+b} - B_{m+a,n+b}),$$

$$\sigma_{m,n}^{N} = \sum_{(a,b)\in S} \alpha_{m,n,m+a,n+b}(G_{m+a,n+b} - N_{m+a,n+b}),$$

According to another embodiment of the exemplary embodiments, with regard to an NIR channel, channel interference due to color saturation may not be considered. In this case, the NIR channel may use an estimate from which channel interference with only a base channel is removed, without considering R, G, and B channels, as represented by Equation 17 below:

$$\overline{N}_{m,n}^{Base} = Base_{m,n} + \sum_{(a,b)\in S} \alpha_{m,n,m+a,n+b}(N_{m+a,n+b} - Base_{m+a,n+b}),$$ [Equation 17]

An embodiment of the exemplary embodiments may be applied to a digital camera system using a sensor having a structure of RGB and NIR pixels. In particular, an embodiment may be applied to a security camera.

Figure 19:
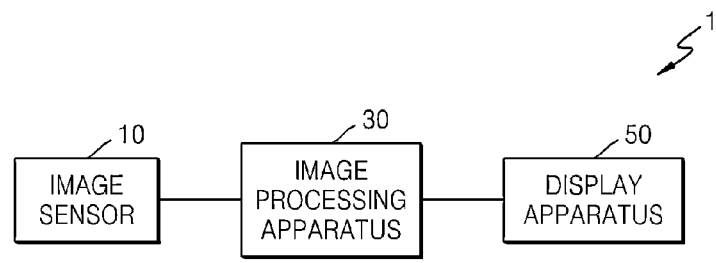
FIG. 19 is a block diagram of a camera system according to an embodiment.

FIG. 19 is a block diagram of a camera system 1 according to an embodiment of the exemplary embodiments.

Referring to FIG. 19, the camera system 1 includes an image sensor 10, an image processing apparatus 30, and a display apparatus 50. The camera system 1 may be an image capturing system, such as a digital camera, a camcorder, or a security camera, or may be mounted in a computer, a PDA, a PMP, or a mobile phone.

The image sensor 10 may be a photoelectric conversion device such as a charge coupled device (CCD) or a complementary metal oxide semiconductor (CMOS) device. The image sensor 10 includes a pixel array having a plurality of pixels in which the photoelectric conversion device converts an optical signal into an electrical image signal. An MFA for transmitting light of visible and invisible bands is disposed on the image sensor 10. The MFA includes color filters for transmitting optical components of certain colors, such as RGB from among visible bands, and an NIR filter for transmitting optical components of an NIR region from among invisible bands.

Color filters RCF, GCF, and BCF, and an NIR filter NIRF of the MFA are disposed to individually correspond to pixels of the image sensor 10, which sense color channel signals R, G, and B, and an NIR channel signal NIR passed through the MFA.

A lens (not shown) for receiving an optical signal may be disposed in front of the image sensor 10.

The image processing apparatus 30 outputs a high-resolution MFA image in which artifacts are minimized, using information input to RGB color pixels and an NIR pixel of the image sensor 10 including the MFA.

According to the exemplary embodiments, by converting an MFA pattern image into a quincuncial pattern image and then performing edge adaptive interpolation, a low-resolution MFA image may be obtained. After that, by compensating for high-frequency and medium-frequency components of the low-resolution MFA image using a high-resolution base image, a high-resolution MFA image may be obtained. Also, in order to remove color artifacts due to aliasing, which damages high-frequency components of an interpolation result at a detailed part of the high-resolution MFA image, channel interference may be suppressed. Thus, color distortion may be removed.

The exemplary embodiments can also be implemented as computer-readable code on a computer-readable recording medium. The computer-readable recording medium is any data storage device that can store data, which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the exemplary embodiments can be easily construed by programmers of ordinary skill in the art.

The exemplary embodiments can also be implemented using structural features. For example, any of the adaptive interpolation unit 110, the frequency compensation unit 120, and the channel interference suppression unit may include a processor, a hardware module, or a circuit for performing their respective functions.

While the exemplary embodiments have been particularly shown and described with reference to exemplary embodiments thereof, it will be understood by one of ordinary skill in the art that various changes in form and details may be made therein without departing from the spirit and scope of the exemplary embodiments as defined by the following claims. The exemplary embodiments should be considered in a descriptive sense only, and not for purposes of limitation. Therefore, the scope of the exemplary embodiments are defined, not by the detailed description of the exemplary embodiments, but by the following claims, and all differences within the scope will be construed as being included in the exemplary embodiments.

What is claimed is:

1. An image processing apparatus comprising:
   an adaptive interpolation device configured to convert a multispectral filter array (MFA) pattern image into a quincuncial pattern image based on difference values in a diagonal pixel direction, and interpolate color channels and a near infrared (NIR) channel of the MFA pattern image to a maximum resolution, based on difference values of the converted quincuncial pattern image in vertical pixel directions and horizontal pixel directions;
   a frequency compensation device configured to obtain a high-resolution MFA image using high-frequency components and medium-frequency components of a high-resolution base image corresponding to high-frequency components and medium-frequency components of a low-resolution MFA image interpolated by the adaptive interpolation device, based on linear regression analysis and a result of comparing energy levels of MFA channel images to an energy level of a base image; and
   a channel interference suppression device configured to remove color distortion generated between each channel of the high-resolution MFA image, and a first channel of the high-resolution MFA image and a base channel using a weighted average of pixel value differences between each channel of the high-resolution MFA image, and a second channel of the high-resolution MFA image and the base channel.

2. The image processing apparatus of claim 1, wherein the quincuncial pattern image is an image having a same geometric model as a Bayer pattern image, and having different channel values from the Bayer pattern image.

3. The image processing apparatus of claim 1, wherein, when the MFA pattern image is converted into the quincuncial pattern image, the adaptive interpolation device uses a sum of a first weighted average of values of pixels spaced apart from a certain pixel (m,n) of the MFA pattern image by one pixel in a diagonal direction, and a second weighted average, obtained by calculating a weighted average of difference values between the certain pixel (m,n) of the MFA pattern image and pixels spaced apart from the certain pixel (m,n) of the MFA pattern image by two pixels in the diagonal direction.

4. The image processing apparatus of claim 3, wherein each weight used to calculate the first weighted average and the second weighted average is inversely proportional to a difference value in each pixel direction.

5. The image processing apparatus of claim 1, wherein the frequency compensation device generates the high-resolution MFA image by comparing the medium-frequency components and the high-frequency components of the low-resolution MFA image interpolated by the adaptive interpolation device to medium-frequency components and high-frequency components of the base image in each of vertical, horizontal, and diagonal directions, calculating a weighted sum of corresponding parts, and reconstructing the medium-frequency components and the high-frequency components of the low-resolution MFA image interpolated by the adaptive interpolation device.

6. The image processing apparatus of claim 1, wherein the frequency compensation device provides a weight to each of the medium-frequency components and the high-frequency components of the low-resolution MFA image and medium-frequency components and high-frequency components of the base image, and
   wherein the weight is set such that a large weight is provided to an edge of the low-resolution MFA image or an edge of the base image, whichever has a higher energy level.

7. The image processing apparatus of claim 1, wherein the frequency compensation device calculates a ratio between energy levels of medium-frequency components and high-frequency components of the base image and the MFA image, using the linear regression analysis, and provides a weight for correcting an energy level difference.

8. The image processing apparatus of claim 7, wherein the frequency compensation device removes color distortion between channels by strongly reconstructing medium-frequency components and high-frequency components of a channel having a high energy level of the high-frequency components, and weakly reconstructing medium-frequency components and high-frequency components of a channel having a low energy level of the high-frequency components using the weight for correcting the energy level difference, so as to allow edges of channels to be uniform in consideration of energy levels of red (R), green (G), blue (B), and NIR channels of the MFA image.

9. An image processing method comprising:
   converting a multispectral filter array (MFA) pattern image into a quincuncial pattern image based on difference values in a diagonal pixel direction, and interpolating color channels and a near infrared (NIR) channel of the MFA pattern image to a maximum resolution, based on difference values of the converted quincuncial pattern image in vertical pixel directions and horizontal pixel directions, using an adaptive interpolation device;

obtaining a high-resolution MFA image using high-frequency components and medium-frequency components of a high-resolution base image corresponding to high-frequency and medium-frequency components of a low-resolution MFA image interpolated by the adaptive interpolation device, based on linear regression analysis and a result of comparing energy levels of MFA channel images to an energy level of a base image, using a frequency compensation device; and removing color distortion generated between each channel of the high-resolution MFA image, and a first channel of the high-resolution MFA image and a base channel using a weighted average of pixel value differences between each channel of the high-resolution MFA image, and a second channel of the high-resolution MFA image and the base channel, using a channel interference suppression device.

10. The image processing method of claim 9, wherein the quincuncial pattern image is an image having a same geometric model as a Bayer pattern image, and having different channel values from the Bayer pattern image.

11. The image processing method of claim 9, wherein, when the MFA pattern image is converted into the quincuncial pattern image, a sum of a first weighted average of values of pixels spaced apart from a certain pixel (m,n) of the MFA pattern image by one pixel in a diagonal direction, and a second weighted average, obtained by calculating a weighted average of difference values between the certain pixel (m,n) of the MFA pattern image and pixels spaced apart from the certain pixel (m,n) of the MFA pattern image by two pixels in the diagonal direction, is used.

12. The image processing method of claim 11, wherein each weight used to calculate the first weighted average and the second weighted average is inversely proportional to a difference value in each pixel direction.

13. The image processing method of claim 9, wherein the obtaining of the high-resolution MFA image comprises generating the high-resolution MFA image by comparing the medium-frequency components and the high-frequency components of the low-resolution MFA image interpolated by the adaptive interpolation device to medium-frequency components and high-frequency components of the base image in each of vertical, horizontal, and diagonal directions, calculating a weighted sum of corresponding parts, and reconstructing the medium-frequency components and the high-frequency components of the low-resolution MFA image interpolated by the adaptive interpolation device.

14. The image processing method of claim 9, wherein the obtaining of the high-resolution MFA image comprises providing a weight to each of the medium-frequency components and the high-frequency components of the low-resolution MFA image and medium-frequency components and high-frequency components of the base image, and wherein the weight is set such that a large weight is provided to an edge of the low-resolution MFA image or an edge of the base image, whichever has a higher energy level.

15. The image processing method of claim 9, wherein the obtaining of the high-resolution MFA image comprises calculating a ratio between energy levels of medium-frequency components and high-frequency components of the base image and the MFA image, using the linear regression analysis, and providing a weight for correcting an energy level difference.

16. The image processing method of claim 15, wherein the obtaining of the high-resolution MFA image comprises removing color distortion between channels by strongly reconstructing medium-frequency components and high-frequency components of a channel having a high energy level of the high-frequency components, and weakly reconstructing medium-frequency components and high-frequency components of a channel having a low energy level of the high-frequency components using the weight for correcting the energy level difference, so as to allow edges of channels to be uniform in consideration of energy levels of red (R), green (G), blue (B), and NIR channels of the MFA image.

* * * * *